(12) United States Patent
Bayne et al.

(10) Patent No.: US 7,573,242 B2
(45) Date of Patent: Aug. 11, 2009

(54) CHARGER SYSTEM AND METHOD

(75) Inventors: Ryan M. Bayne, Waterloo (CA); Skarine Alexei, Waterloo (CA); Steve Green, Waterloo (CA)

(73) Assignee: Research In Motion Limited, Waterloo, Ontario (CA)

( * ) Notice: Subject to any disclaimer, the term of this patent is extended or adjusted under 35 U.S.C. 154(b) by 0 days.

(21) Appl. No.: 11/749,676

(22) Filed: May 16, 2007

(65) Prior Publication Data

US 2007/0236184 A1    Oct. 11, 2007

Related U.S. Application Data

(63) Continuation of application No. 10/834,887, filed on Apr. 30, 2004, now Pat. No. 7,479,762.

(30) Foreign Application Priority Data

Apr. 30, 2004    (GB)    ................... 0309942.1

(51) Int. Cl.
*H02J 7/00*    (2006.01)
(52) U.S. Cl. ................... 320/136; 320/114; 320/132; 320/115; 320/111
(58) Field of Classification Search ........... 320/132, 320/115, 111, 114; 713/320

See application file for complete search history.

(56) References Cited

U.S. PATENT DOCUMENTS

| | | | |
|---|---|---|---|
| 5,982,147 A | | 11/1999 | Anderson |
| 6,163,132 A | * | 12/2000 | Higuchi et al. ............... 320/132 |
| 6,329,787 B1 | | 12/2001 | Takeshi et al. |
| 2002/0038432 A1 | | 3/2002 | Hsu |
| 2003/0141849 A1 | * | 7/2003 | Kobayashi et al. .......... 320/136 |

FOREIGN PATENT DOCUMENTS

| | | |
|---|---|---|
| EP | 0944153 A3 | 9/1999 |
| EP | 1158593 A1 | 11/2001 |
| EP | 1294072 A2 | 3/2003 |
| WO | 200217460 A | 2/2002 |

* cited by examiner

*Primary Examiner*—Edward Tso
*Assistant Examiner*—Alexis Boateng
(74) *Attorney, Agent, or Firm*—Conley Rose, P.C.; J. Robert Brown, Jr.

(57) ABSTRACT

Systems and methods of controlling a charging status indicator in a charging system for a device having a rechargeable power supply are provided. The charging system determines whether a device connected thereto supports remote control of the charging status indicator, and controls the charging status indicator as directed by the device where the device supports remote control of the charging status indicator.

21 Claims, 5 Drawing Sheets

CHARGER SYSTEM AND METHOD

CROSS-REFERENCE TO RELATED APPLICATIONS

This is a continuation application of co-pending U.S. Application Ser. No. 10/834,887 filed Apr. 30, 2004, by Ryan Bayne, et al. and entitled "Charging Status Indicator Control System and Method", which is incorporated herein by reference for all purposes.

BACKGROUND

This invention relates generally to charging of devices having rechargeable power supplies, and in particular to controlling charging status indicators.

Many known charging systems for rechargeable power supplies are configured for connection to a device in which such a power supply is installed, so that the power supply need not be removed from the device for charging. Although charging systems often incorporate a charging status indicator such as an LED, for example, devices are also typically equipped with power supply charge indicators to provide information regarding remaining battery charge to a user. The user can then easily determine when a device power supply should be recharged.

When a device is connected to a charging system, however, the charging status indicator on the charging system and the power supply charge indicator may provide conflicting indications to a user. For example, different devices charged by the same charging system may have different charging current profiles, whereas charging status determination by the charging system is based on a particular profile. In this case, the charging system might either prematurely indicate that the power supply in the device has been fully charged or continue to indicate that the power supply is being charged after it has been fully charged. A correct indication of power supply charge at the device is then inconsistent with the charging status indicator at the charging system, which may confuse a user.

SUMMARY

According to an aspect of the invention, a charging system comprises a device interface configured for connection to a device having a rechargeable power supply, a charging status indicator configured to provide indications of charging status of the rechargeable power supply, and a charging controller connected to the device interface and the charging status indicator, and configured to detect connection of a device to the device interface, to provide charging current to the device, to determine whether the device supports remote control of the charging status indicator, and to control the charging status indicator as directed by the device where the device supports remote control of the charging status indicator.

In accordance with another aspect of the invention, a method of controlling a charging status indicator in a charging system comprises the steps of detecting connection of a device having a rechargeable power supply to the charging system, determining whether the device supports remote control of the charging status indicator, and controlling the charging status indicator as directed by the device where the device supports remote control of the charging status indicator.

BRIEF DESCRIPTION OF THE DRAWINGS

In order that the invention identified in the claims may be more clearly understood, preferred embodiments thereof will be described in detail by way of example, with reference to the accompanying drawings, in which:

DETAILED DESCRIPTION

As described briefly above, devices having rechargeable power supplies often incorporate a power supply charge indicator, which might not always be consistent with a charging status indicator in a charging system used to charge the power supply. Depending on its type and resources, the device may be capable of controlling both its own power supply charge indicator and the charging status indicator in the charging system. For example, a device having a microprocessor, such as a personal digital assistant ("PDA"), a mobile communication device, a cellular phone, a wireless two-way e-mail communication device, and other types of device, may have remote charging status indication control capabilities in conjunction with a suitably configured charging system.

Figure 1:
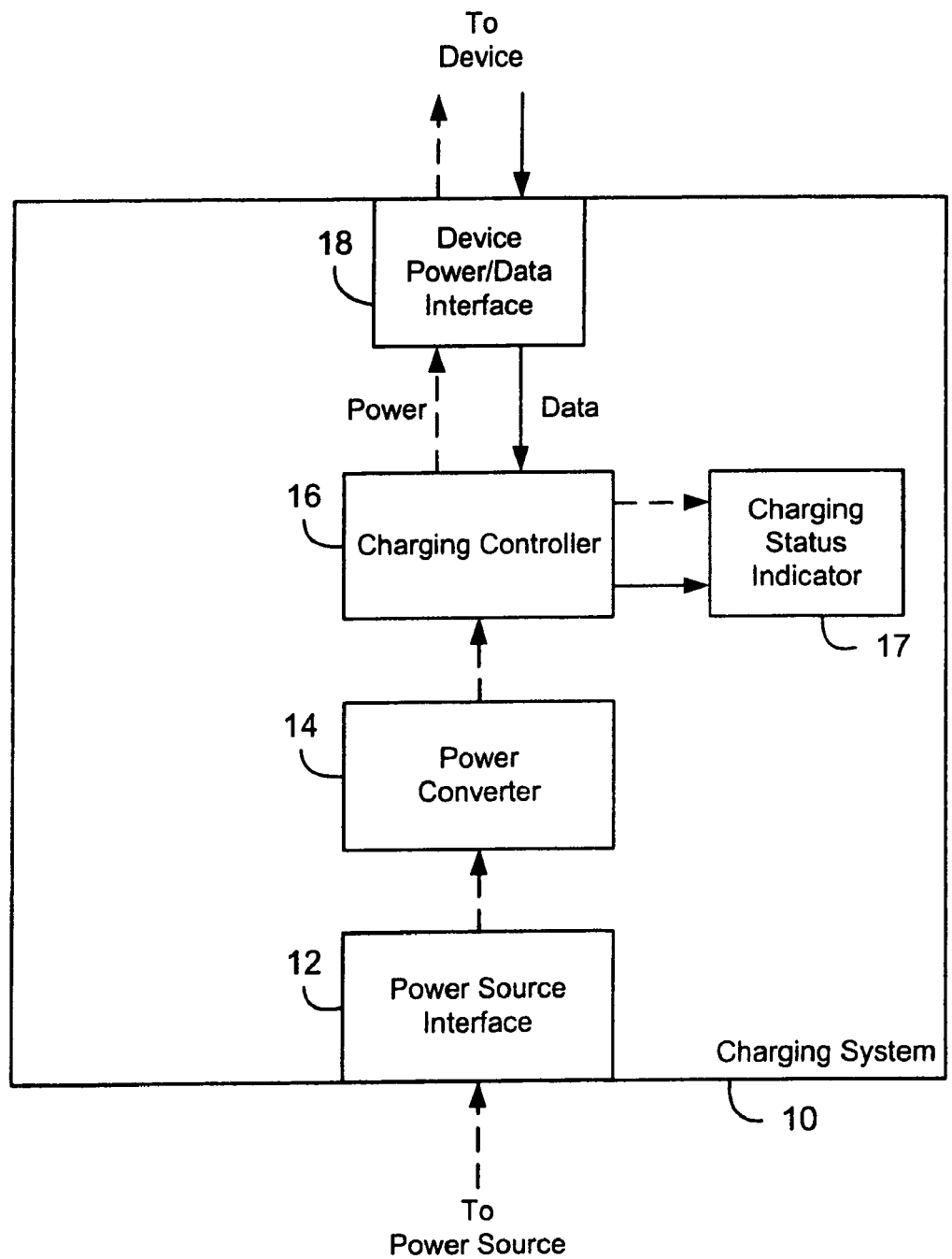
FIG. 1 is a block diagram of a charging system having a charging status indicator.

FIG. 1 is a block diagram of a charging system having a charging status indicator. The charging system 10 includes a power source interface 12, a power converter 14, a charging controller 16, a charging status indicator 17, and a device power and data interface 18. As indicated between the charging controller 16 and the device power and data interface 18, dashed lines indicate power transfer, while solid lines are used for data connections.

The power source interface 12 is configured for connection to a power source from which rechargeable power supplies are charged. In one embodiment, the power source interface 12 is a plug unit that can be used to couple with a conventional power socket to receive power therefrom. For example, such a plug unit may be a two prong or three prong plug of the type used in North America that can couple to a North American AC power socket. Alternatively, the power source interface 12 can accept one or more types of plug adapters configured to couple the power source interface 12 to corresponding types of power sockets. The use of interchangeable plug adapters has the advantage of allowing the same charging system to be used with a variety of types of power source, depending on availability. Thus, the power source interface 12 is configured to receive energy from a power source either directly or through the use of a plug adapter, and is operative to transfer the received energy to the power converter 14.

A power converter such as 14 typically includes at least one of the following components: a switching converter, a transformer, a DC source, a voltage regulator, linear regulator, and a rectifier. The power converter 14 is operative to receive energy from a power source through the power source interface 12, and to convert that received energy to a form that can be used as a charging current to charge power supplies in devices connected to the charging system 10. For example, the power converter 14 can be of substantially conventional construction, such as a switching power converter that converts 115 VAC to 5 VDC. DC-to-DC converters or DC regulators, which convert DC inputs to DC outputs are also common in such power converters. In one embodiment, the power converter 14 is adapted to accept a wide range of input energy levels and frequencies from the power source interface 12. Alternatively, the power converter 14 is adapted to accept a limited range of input energy levels and frequencies, and the power source interface 12, or each plug adapter if any, is operable to convert the input energy levels and frequencies into a range that the power converter 14 can accommodate. The power converter 14 provides its energy output to the charging controller 16.

The charging controller 16 controls the amount of charging current applied to a device connected to the device power and data interface 18, and also controls the charging status indicator 17, as described in further detail below. Although the charging controller 16 is preferably implemented in firmware, such as a microprocessor executing charging control software, those skilled in the art appreciate that hardware implementations of the charging controller 16 are also possible.

The charging status indicator 17 is typically an LED that is turned on by the charging controller 16 while the charging system 10 is charging a rechargeable power supply and then turned off when charging is complete. The use of multiple LEDs in a charging status indicator such as 17 is also known. For example, an LED of one color is turned on by the charging controller 16 to indicate that a power supply is being charged, and when the power supply is charged to some predetermined level, an LED having a different color is turned on. Sequential illumination of multiple LEDs is also used to provide an indication that a power supply is being charged, and the current charge level. Other types of charging status indicator, both LED-based and other types, will also be apparent to those skilled in the art. It should be appreciated that the present invention is in no way dependent upon any particular type of charging status indicator 17.

The device power and data interface 18 is compatible with an interface provided on a device having a power supply to be charged by the charging system 10. Through the interface 18, charging current is supplied from the charging system 10 to the device and data is transferred from the device to the charging system. A single interface 18, such as a USB interface, for example, that provides for transfer of both power and data is generally preferable. However, separate power and data interfaces may instead be provided as the power and data interface 18.

In operation, the charging controller 16 detects the connection of a device having a rechargeable power supply to the device power and data interface 18. In accordance with an aspect of the invention, the charging controller 16 then determines whether the connected device supports remote control of the charging status indicator 17. This determination is based, for example, on an indicator control signal generated by the device and received by the charging controller 16. If the interface 18 includes separate power and data interfaces, then the charging controller 16 may detect the connection of the device to both the power and data interfaces, and assume that a device connected to both interfaces supports remote charging status indicator control. The charging controller 16 similarly determines that a device connected to only the power interface does not support remote indicator control.

Responsive to a determination that the connected device does not support remote control of the charging status indicator 17, the charging controller 16 preferably provides charging current to the connected device and controls the charging status indicator 17 in a conventional fashion. Charging status is typically determined by measuring the current drawn by a connected device, terminal voltage at the interface 18, or some combination thereof. A "charging" indication is usually provided as long as the measured current exceeds a predetermined threshold, whereas a "charged" indication is provided when the measured current drops below the threshold.

Where the connected device has the capability to remotely control the charging status indicator 17, the charging controller 16 also provides charging current to the connected device, but controls the charging status indicator 17 as directed by the connected device, instead of on the basis of conventional current or voltage monitoring. In one embodiment, an indicator control signal generated by the connected device notifies the charging control system 16 that the connected device supports remote control of the charging status indicator 17. The charging control system then controls the charging status indicator 17 to display a "charging" indication. Thereafter, the charging status indicator 17 is controlled by the charging controller 16 as directed by the connected device. When the connected device sends a charging status update signal, to indicate that its power supply is charged, for example, the charging controller 16 controls the charging status indicator 17 to provide a "charged" indication. Control of both a device power supply charge indicator and the charging status indicator 17 by the connected device provides consistent indications to a user. Although the charging controller 16 may continue to monitor current and voltage for other purposes, control of the charging status indicator 17 is directed by the connected device. Disconnection of the device from the device power and data interface 18, or from the data interface where separate interfaces are provided, is preferably detected by the charging controller 16, and the charging status indicator 17 is then either turned off, if the device is disconnected from both interfaces, or controlled in a conventional manner if a connection to a separate power interface is maintained.

Remote control of the charging status indicator 17 is either indirect, through the charging controller 16, or direct. Indirect control, by providing control signals to the charging controller 16 instead of directly to the charging indicator 17 is preferred in that drivers for the charging status indicator 17 are not required at the device and no data connection between the interface 18 and the charging status indicator 17 is necessary. For a software- or firmware-based charging controller 16, indirect control tends to be simpler. However, direct control of the charging status indicator 17 by the connected device is also contemplated, particularly for a hardware-based charging controller 16.

Figure 2:
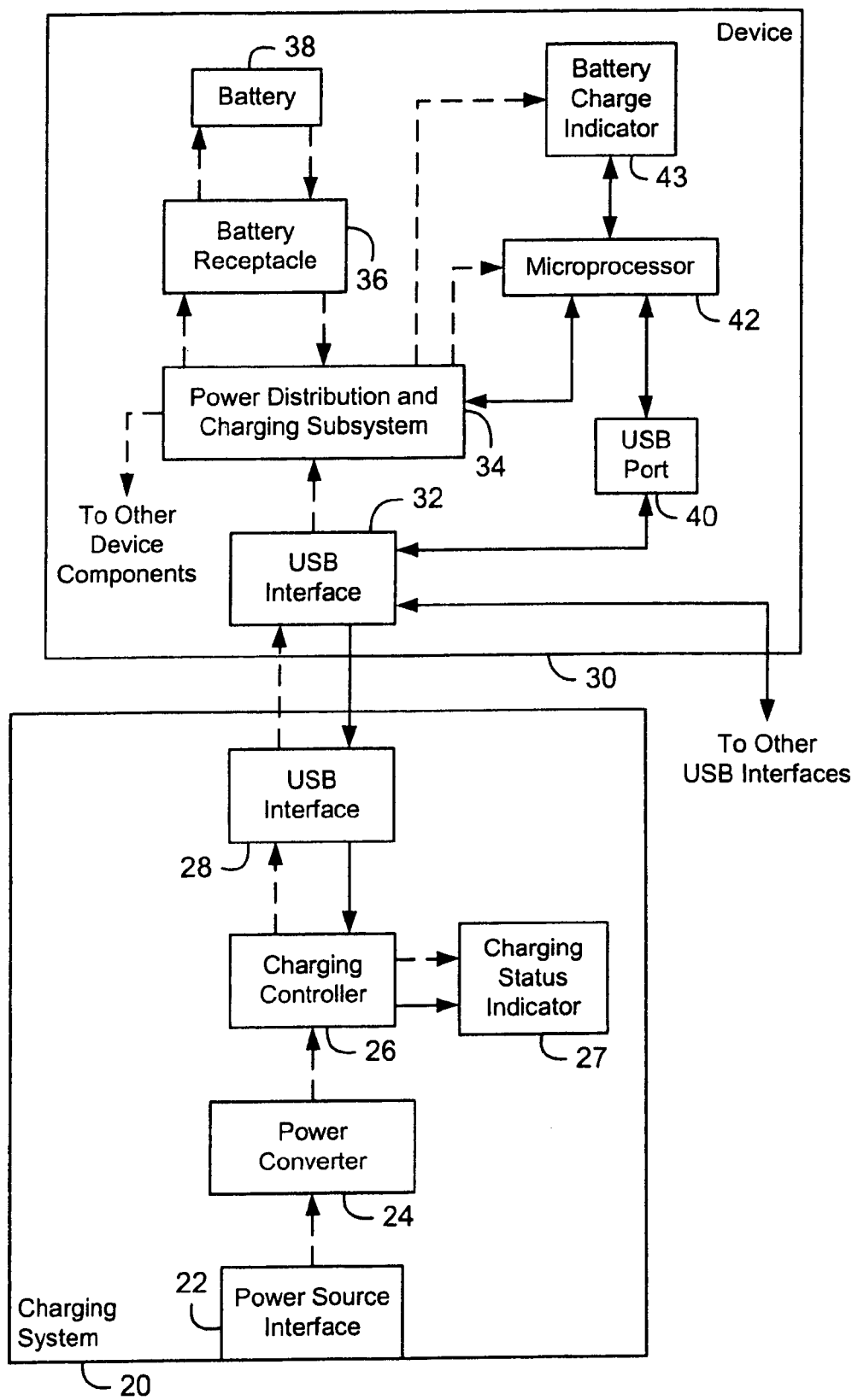
FIG. 2 is a block diagram of a charging system connected to a device having a rechargeable power supply.

FIG. 2 is a block diagram of a charging system connected to a device having a rechargeable power supply. In the charging system 20, the components 22, 24, 26, 27, and 28 are substantially the same as the similarly-labeled components in FIG. 1, except that the device power and data interface is a USB interface 27 in FIG. 2. The device 30, as shown, includes a USB interface 32 to the charging system 20, a power distribution and charging subsystem 34, a battery receptacle 36 for receiving a rechargeable battery 38, a USB port 40, a microprocessor 42, and a battery charge indicator 43.

The battery 38 supplies power for the device 30 through the power distribution and charging subsystem 34. The power distribution and charging subsystem 34 preferably uses the power provided by the charging system 20 to both provide operating power to the device 30 and to charge the battery 38. The particular design of the power distribution and charging subsystem 34 is dependent upon the type of the device 30, as will be apparent to those skilled in the art, and is substantially independent of the charging status indicator control scheme described herein. In the device 30, the power distribution and charging subsystem 34 provides operating power to the microprocessor 42, the battery charge indicator 43, and other device components. A data connection between the microprocessor 42 and the power distribution and charging subsystem 34 provides for software-based control and monitoring of the power distribution and charging subsystem 34. The microprocessor 42 also determines a remaining charge level of the battery 38, by monitoring it terminal voltage, for example, and provides an indication of battery charge to a user via the battery charge indicator 43. The battery charge indicator 43 may include, for example, one or more LEDs or a user interface (UI) component that displays an indication of battery charge level on a device display (not shown).

Another function of the microprocessor 42, in accordance with an aspect of the present invention, is to determine charging status of the battery 38 when the device 30 is connected to the charging system 20. As described above, the power distribution and charging system 34 preferably draws current from the charging system 20 to both charge the battery 38 and provide operating power to the device 30. As such, the total amount of current drawn by the device 30 can be greater than a normal charging current for the battery 38 itself, and the device 30 draws current after the battery 38 is fully charged. This may cause the charging controller 26 to control the charging status indicator 26 to provide a "charging" indication even though the battery 38 is no longer being charged. Varying charging current characteristics between different devices may also introduce errors in charging status indication at the charging system 20. The microprocessor 42 or software executed by the microprocessor 42 is configured to determine actual charging status of the battery 38, by measuring the charging current being drawn by the battery 38 and comparing the measured current against known charging current profile for the device 30, for example, and to control both the battery charge indicator 43 and the charging status indicator 27 accordingly.

Operation of the charging system 20 is substantially as described above. When the device 30 is connected to the USB interface 28, the charging controller 26 determines whether the device 30 supports remote control of the charging status indicator 27. In one embodiment, this determination is based on a predetermined potential or signal pattern applied to the USB connection between the USB interfaces 32 and 28 by the device 30, as described in further detail below with reference to FIG. 3.

Figure 3:
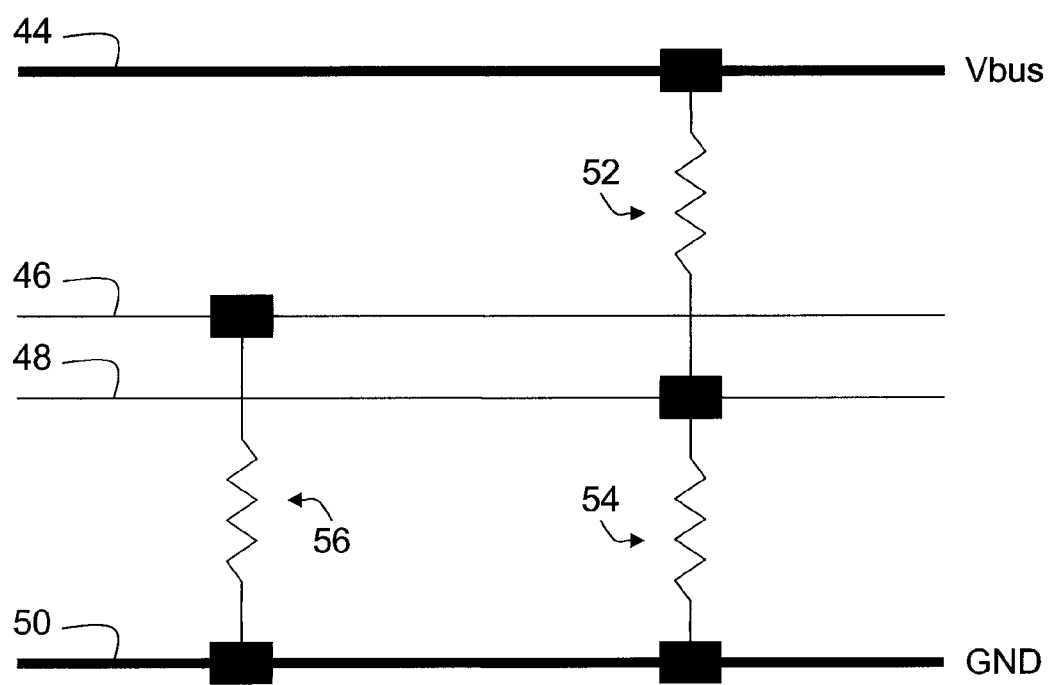
FIG. 3 is a schematic diagram of the Universal Serial Bus (USB) interface 28 of FIG. 2.

FIG. 3 is a schematic diagram of the USB interface 28 of FIG. 2. It will be apparent to those skilled in the art that the Vbus line 44 and the GND line 50 carry power from the interface 28 to the interface 32, and the D+ and D− data lines 46 and 48 provide the data connection. The resistors 52 and 54, illustratively 7.5 kΩ and 15 kΩ, respectively, create a pull-up on the D− data line 48. In order to notify the charging system 20 that it supports remote control of the charging status indicator 27, the device 30 momentarily drives the D− data line 48 to a low level for a predetermined time when it is connected to the charging system 20, and then allows it to return to a high level. These transitions are detected by the charging controller 26 and interpreted as an indicator control signal, which serves to notify the charging controller 26 that the device 30 supports remote control of the charging status indicator 27. Charging status update signals are then provided to the charging controller 26 to control the charging status indicator 27.

The number and types of charging status update signals provided to the charging system 20 depend, for example, on the type of charging status indicator 27 and the USB interface 28. In a preferred charging status update signaling scheme, the device 30 pulls the D− line 48 to a low level a second time to indicate that the battery 38 is fully charged. If the charging status indicator 27 provides multi-level charging status indications, then additional charging status update signals may be provided to indicate a present charge level of the battery 38, charging time remaining, and the like. It is also possible to configure the USB interface 28 to receive charging status update signals via the D+ and D− data lines 46 and 48.

The data connection between the USB interfaces 28 and 32 is shown in FIG. 2 as a one-way connection, with data flowing from the device 30 to the charging system 20. However, a two-way data connection may also be desirable, so that the device 30 can also detect that it has been connected to the charging system 20, for example. Typically, USB devices can draw limited current from a USB host. In the case of a charging system, such a limit may be undesirable. Therefore, when the device 30 is connected to the USB interface 28, an identification signal is preferably provided to the device 30 to notify the device 30 that it is connected to a power source that is not subject to the normal power limits imposed by the USB specification. The identification signal also preferably causes the device 30 to provide an indicator control signal to the charging system 20.

An identification signal is provided, for example, by the charging controller 26. In a more "passive" approach, USB interface 28 is configured to provide the identification signal. As described above, the resistors 52 and 54 create a slight pull-up on the D− data line 48. Although the resistor 56 creates a slight pull-down on the D+ data line 46, D+ is pulled up by a stronger pull-up at the device 30 when it is connected to the charger 20. Thus, in this embodiment, detection of the abnormal data line condition of both D− and D+ being high, in most implementations by the microprocessor 42, is interpreted as the identification signal. The detection of the identification signal may be accomplished using a variety of methods. For example, the microprocessor 42 may detect the identification signal by detecting the presence of the above or another abnormal data line condition at the USB port 40. The detection may also be accomplished through the use of other device subsystems in the device 30. Further details of USB-based charging are provided in the following U.S. patent applications: Ser. Nos. 10/087,629, and 10/087,391, both filed on Mar. 1, 2002 and assigned to the owner of the instant application. The disclosure of each of these applications, including the specification and drawings thereof, is hereby incorporated in its entirety herein by reference.

Referring again to FIG. 3, the resistor 56, connected between the D+ data line 46 and the GND line 50, results in a pull-down on the D+ data line 46. The stronger pull-up at the device 30 pulls D+ high when the device 30 is connected to the charging system 20. Connection of the device 30 to the charging system 20 can therefore be detected by detecting that D+ has been pulled high. Other detection schemes may be apparent to those skilled in the art.

In response to the identification signal, the device 30 generates the indicator control signal and the power distribution and charging system 34 draws power through Vbus and GND lines 44 and 50 of the USB interface 28 without waiting for the normal USB processes of enumeration or charge negotiation.

The USB connection between the device 30 and the charging system 20 could be further exploited beyond charging the device 30. For example, the USB interface 32 may also be connected to other USB interfaces in other devices or systems, to support such extended functions as indirectly powering or charging power supplies in other devices and systems through the device 30 through a conventional USB connection. The device 30 then provides an interface to another device or power supply that is not itself compatible with the charging system 20.

Figure 4:
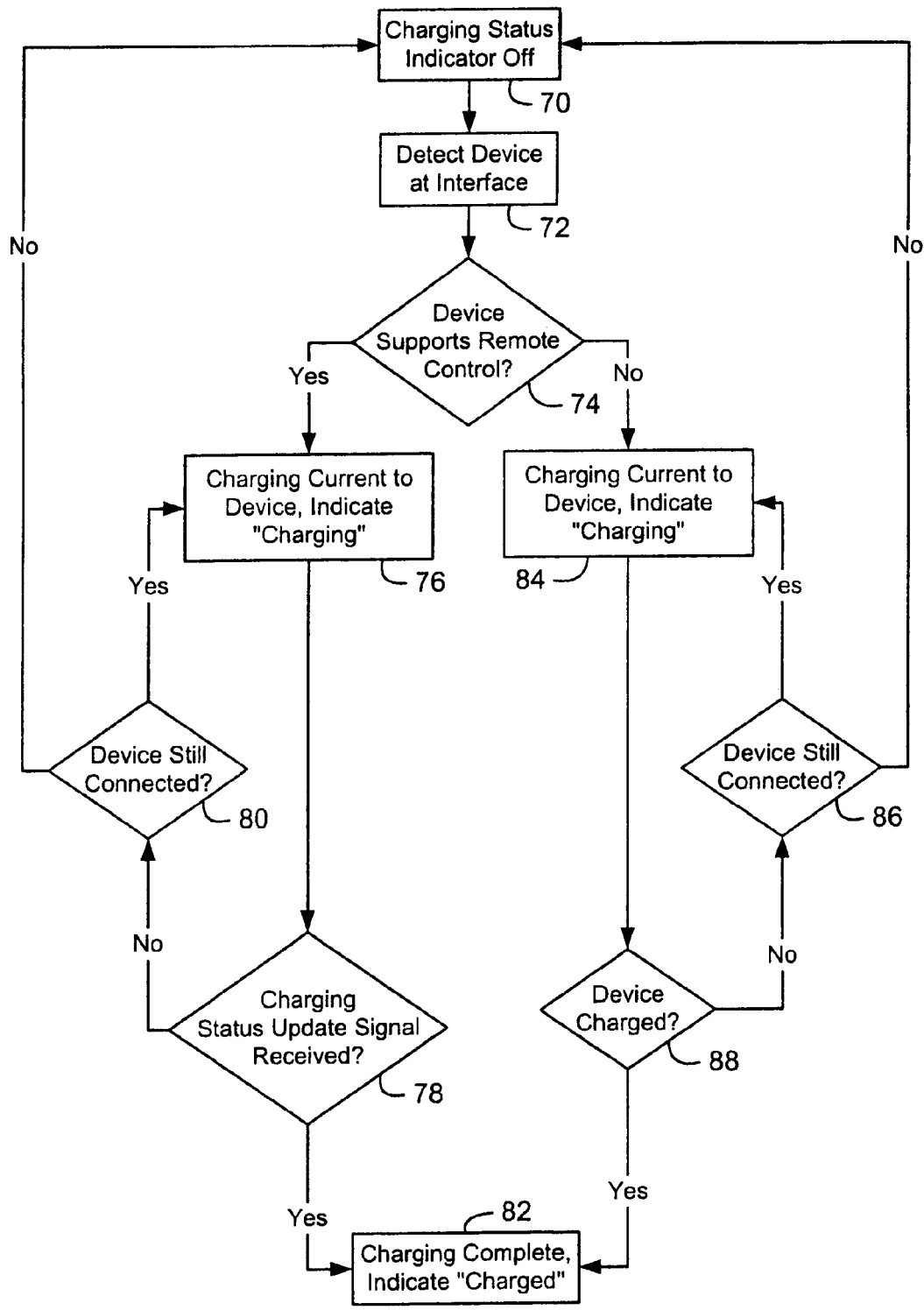
FIG. 4 is a flow diagram illustrating a charging status indication control method.

FIG. 4 is a flow diagram illustrating a charging status indication control method. The steps in the method have been described in detail above and are therefore described briefly below.

As indicated at 70, a charging status indicator in a charging system is normally turned off unless a device is connected to the charging system. Connection of a device having a rechargeable power supply is detected at step 72. At step 74, a determination is made as to whether the connected device supports remote control of the charging status indicator, based on detection of an indicator control signal as described above, for example. If so, then charging current is provided to the device, and the charging status indicator provides a "charging" indication, at step 76. Steps 78 and 80 respectively illustrate monitoring for a charging status update signal and disconnection of the device. In the example method of FIG. 4, the "charging" indication is maintained until a charging status update signal is received, as detected at step 78, or disconnection of the device is detected at step 80. When a charging status update signal indicating that the device power supply has been charged is received, charging is complete, and the charging status indicator is controlled to provide a "charged" indication at step 82. Disconnection of the device turns the status indicator off, as shown at step 70.

Where it is determined at step 74 that the connected device does not support remote control of the charging status indicator, charging current is provided to the device and the charging status indicator provides a "charging" indication at step 84. The charging status indicator is then controlled in a conventional manner, based on the charging system determining when the device power supply has been charged, at step 88, or that the device has been disconnected, at step 86. Once the device power supply has been charged, charging is complete, and the charging status indicator provides a "charged" indication at step 82.

The method shown in FIG. 4 and described above is one illustrative example of a charging status indicator control method. Modifications of the method are possible without departing from the invention.

For example, although only "charging" and "charged" indications are shown, the charging status control is also applicable to multiple-phase charging cycles, including a constant current phase, a constant voltage phase, and a time-limited top-off charging phase, for example. A series of charging status update signals may be provided by a device and detected by a charging system to indicate charging cycle status. Multiple charging status update signals are also preferred if a charging status indicator can indicate power supply charge level or remaining charging time during a charging operation. In other embodiments of the invention, multiple charging status update signals are used to toggle the charging status indicator between "charged" and "charging" indications.

In addition, the method may revert to one of remote control and conventional control responsive to detection of certain conditions. If a device's power supply is at a very low charge level, it may be unable to pull down the D− data line when the device is connected to the charging system to provide an indicator control signal as described above. Even though the device supports remote control of the charging status indicator, it is unable to notify the charging system accordingly. However, after the power supply is partially charged, the device is able to pull down the line to provide an indicator control signal. Where the charging system is configured to monitor the D− data line after charging has begun, a "late" indicator control signal can be detected, and the method preferably reverts to remote indicator control. In the case of separate power and data interface, the method preferably reverts to conventional control if the device is disconnected from the data interface.

Further, although the decision steps 78, 80, 86, and 88 are shown as separate steps, it should be appreciated that these steps are preferably monitoring operations that are performed during power supply charging. The charging at steps 76 and 84 need not be halted to check for a charging status update signal at step 78 or a power supply charge level at step 88. Similarly, detection of disconnection of a device at steps 80 and 86 interrupts the charging at steps 76 and 84, but the operation of detecting whether a device has been disconnected, such as by polling an interface or monitoring for a detection signal, preferably does not require the charging to be halted.

Figure 5:
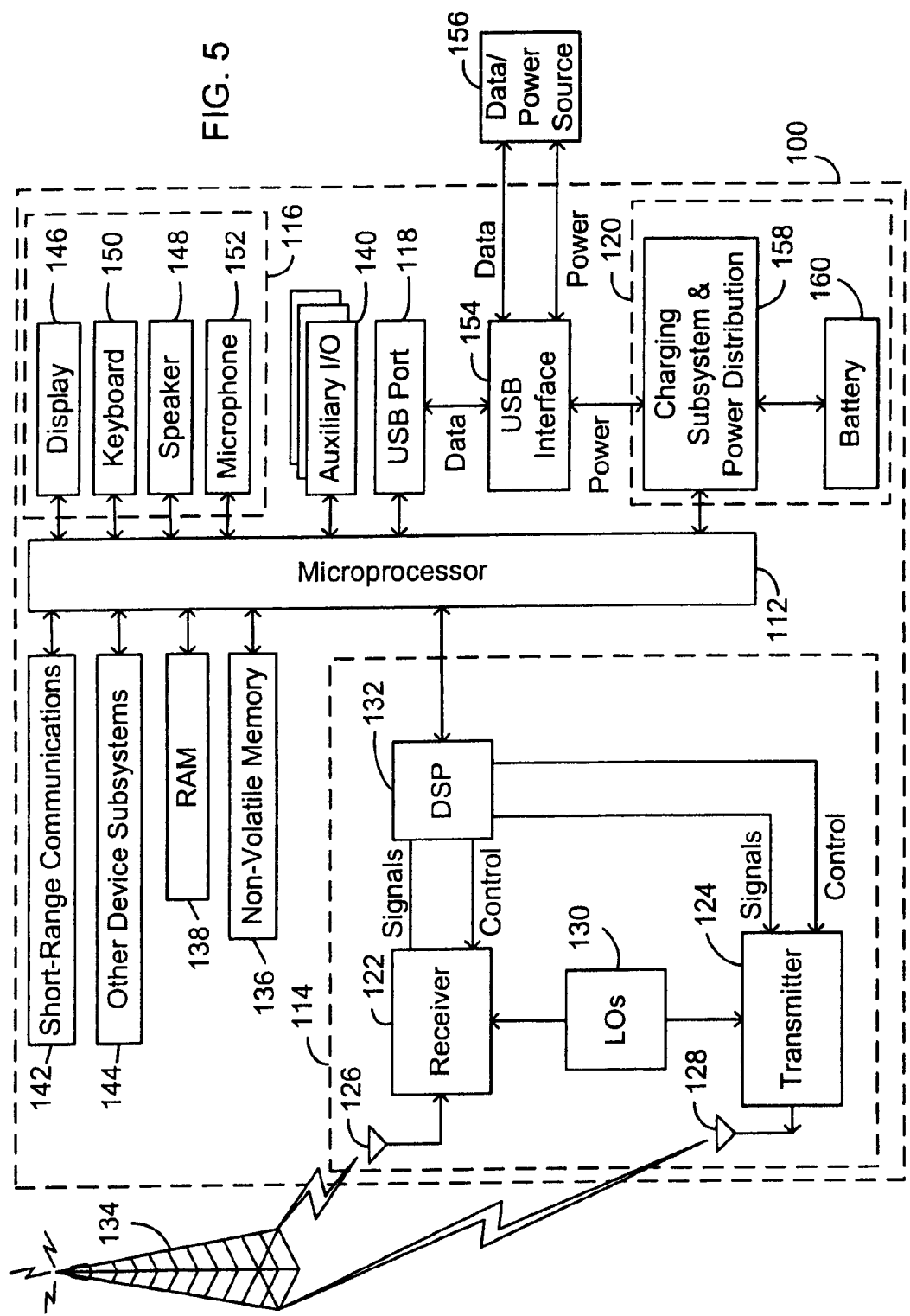
FIG. 5 is a block diagram of a wireless mobile communication device.

FIG. 5 is a block diagram of a wireless mobile communication device, which is one type of device for which the charging status indicator control schemes disclosed herein are applicable. The wireless mobile communication device ("mobile device") 100 is preferably a two-way communication device having at least voice or data communication capabilities. Preferably, the mobile device 100 is also capable of communicating over the Internet, for example, via a radio frequency ("RF") link.

The exemplary mobile device 100 comprises a microprocessor 112, a communication subsystem 114, input/output ("I/O") devices 116, a USB port 118, and a power subsystem 120. The microprocessor 112 controls the overall operation of the mobile device 100. The communication subsystem 114 provides the mobile device 100 with the ability to communicate wirelessly with external devices such as other mobile devices and other computers. The I/O devices 116 provide the mobile device 100 with input/output capabilities for use with a device user. The USB port 118 provides the mobile device 100 with a serial port for linking directly with other computers and/or a means for receiving power from an external power source, as described above. The power subsystem 120 provides the mobile device 100 with a local power source.

The communication subsystem 114 comprises a receiver 122, a transmitter 124, antenna elements 126 and 128, local oscillators (LOs) 130, and a digital signal processor (DSP) 132. The particular design of the communication subsystem 114 and the components used therein can vary. It would be apparent to one of ordinary skill in the art to design an appropriate communication subsystem using conventional methods and components to operate over a communication network 134 based on the parameters necessary to operate over that communication network. For example, a mobile device 100 geographically located in North America may include a communication subsystem 114 designed to operate within the Mobitex™ mobile communication system or DataTAC™ mobile communication system, whereas a mobile device 100 intended for use in Europe may incorporate a General Packet Radio Service (GPRS) communication subsystem 114.

Network access requirements will also vary depending upon the type of network 134. For example, in the Mobitex and DataTAC networks, mobile devices 100 are registered on the network using a unique personal identification number or PIN associated with each device. In GPRS networks however, network access is associated with a subscriber or user of a mobile device 100. A GPRS device therefore requires a subscriber identity module (not shown), commonly referred to as a SIM card, in order to operate on a GPRS network. Without a SIM card, a GPRS device will not be fully functional. Local or non-network communication functions (if any) may be operable, but the mobile device 100 will be unable to carry out any functions involving communications over the network 134, other than legally required functions such as '911' emergency calling.

When required, after the network registration or activation procedures have been completed, a mobile device 100 may send and receive communication signals over the network 134. Signals received by the antenna element 126 are input to the receiver 122, which typically performs such common receiver functions as signal amplification, frequency down conversion, filtering, channel selection, and in the exemplary system shown in FIG. 5, analog to digital conversion. Analog to digital conversion of a received signal allows more complex communication functions such as demodulation and decoding to be performed in the DSP 132. Similarly, signals to be transmitted are processed, including modulation and encoding for example, by the DSP 132 and input to the transmitter 124 for digital to analog conversion, frequency up conversion, filtering, amplification, and transmission over the communication network 134 via the transmitter antenna element 128. The DSP 132 not only processes communication signals, but also provides for receiver and transmitter control. For example, signal gains applied to communication signals in the receiver 122 and transmitter 124 may be adaptively controlled through automatic gain control algorithms implemented in the DSP 132.

In implementing its device operation control function, the microprocessor 112 executes an operating system. The operating system software used by the microprocessor 112 is preferably stored in a persistent store such as the non-volatile memory 136, or alternatively read only memory (ROM) or similar storage element. The microprocessor 112 may also enable the execution of specific device software applications, such as a remote charging status indicator control application or module, for example, which preferably are also stored in a persistent store. The operating system, specific device applications, or parts thereof, may also be temporarily loaded into a volatile store such as in RAM 138. The non-volatile memory 136 may be implemented, for example, as a flash memory component, or a battery backed-up RAM, for example.

A predetermined set of software applications which control basic device operations, including at least data and voice communication applications for example, will normally be installed on the mobile device 100 during manufacture. One such application loaded on the mobile device 100 could be a personal information manager (PIM) application. The PIM application is preferably a software application for organizing and managing user inputted data items such as e-mail, calendar events, voice mails, appointments, and task items. The PIM data items may be stored in the RAM 138 and/or the non-volatile memory 136.

The PIM application preferably has the ability to send and receive data items, via the wireless network 134. The PIM data items are preferably seamlessly integrated, synchronized and updated, via the wireless network 134, with corresponding data items stored or associated with a host computer system (not shown) used by the device user. The synchronization of PIM data items is a process by which the PIM data items on the mobile device 100 and the PIM data items on the host computer system can be made to mirror each other.

There are several possible mechanisms for loading software applications onto the mobile device 100. For example, software applications may be loaded onto the mobile device 100 through the wireless network 134, an auxiliary I/O subsystem 140, the USB port 118, a short-range communications subsystem 142, such as an infrared ("IR"), Bluetooth™, or 802.11 communication system, or any other suitable subsystem 44. Those skilled in the art will appreciated that "Bluetooth" and "802.11" refer to sets of specifications, available from the Institute for Electrical and Electronics Engineers (IEEE), relating to wireless personal area networks and wireless local area networks, respectively.

When loading software applications onto the mobile device 100, the device user may install the applications in the RAM 138 or the non-volatile memory 136 for execution by the microprocessor 112. The available application installation mechanisms can increase the utility of the mobile device 100 by providing the device user with a way of upgrading the mobile device 100 with additional and/or enhanced on-device functions, communication-related functions, or both. For example, a secure communication application may be loaded onto the mobile device 100 that allows for electronic commerce functions or other financial transactions to be performed using the mobile device 100.

The I/O devices 116 are used to accept inputs from and provide outputs to a user of the mobile device 100. In one mode of operation, a signal received by the mobile device 100, such as a text message or web page download, is received and processed by the communication subsystem 114, forwarded to the microprocessor 112, which will preferably further process the received signal and provides the processed signal to one or more of the I/O devices 116 such as the display 146. Alternatively, a received signal such as a voice signal is provided to the speaker 148, or alternatively to an auxiliary I/O device 140. In another mode of operation, a device user composes a data item such as an e-mail message using a keyboard 150 in cooperation with the display 146 and/or possibly an auxiliary I/O device 140. The composed data item may then be transmitted over a communication network 134 using the communication subsystem 114. Alternatively, a device user may compose a voice message via a microphone 152, or participate in a telephone call using the microphone 152 and the speaker 148.

The short-range communications subsystem 142 allows the mobile device 100 to communicate with other systems or devices, which need not necessarily be similar to device 100. For example, the short-range communications subsystem 142 may include an infrared device, a Bluetooth module, or an 802.11 module, as described above, to support communications with similarly-enabled systems and devices.

The USB port 118 provides the mobile device 10 with a serial port for linking directly with other computers to exchange data and/or to receive power. The USB port 118 also provides the mobile device 100 with a means for receiving power from an external power source. For example, in a personal digital assistant (PDA)-type communication device, the USB port 118 could be used to allow the mobile device 100 to synchronize data with a user's desktop computer (not shown). The USB port 118 could also enable a user to set parameters in the mobile device 100 such as preferences through the use of an external device or software application. In addition, the USB port 118 provides a means for downloading information or software to the mobile device 100 without using the wireless communication network 134. The USB port 118 provides a direct and thus reliable and trusted connection that may, for example, be used to load an encryption key onto the mobile device 100 thereby enabling secure device communication.

Coupled to the USB port 118 is a USB interface 154. The USB interface 154 is the physical component that couples the USB port to the outside world. In the exemplary mobile device 100, the USB interface 154 is used to transmit and receive data from an external data/power source 156, receive power from the external data/power source 156, direct the transmitted/received data from/to the USB port 118, and direct the received power to the power subsystem 120.

The power subsystem 120 comprises a charging and power distribution subsystem 158 and a battery 160, which have been described above. In conjunction with a charging system connected as the data/power source 156, remote control of a charging status indicator by the mobile device 100 in accordance with aspects of the present invention is supported.

This written description may enable those skilled in the art to make and use embodiments having alternative elements that correspond to the elements of the invention recited in the claims. The intended scope of the invention thus includes other structures, systems or methods that do not differ from the literal language of the claims, and further includes other structures, systems or methods with insubstantial differences from the literal language of the claims.

For example, it would be obvious to implement remote charging status indicator control in a charging system configured to simultaneously charge more than one device. In this case, separate charging status indicators are typically provided, and each is controlled substantially independently. At any time, each charging status indicator could be controlled by either a connected device or the charging system. It is also contemplated that such a charging system may incorporate more than one type of device interface, including interfaces with both power and data connections, through which remote charging status indicator control is possible, and interfaces with only power connections, for which corresponding charging status indicators are controlled by the charging system.

The USB connection shown in FIG. 2 is an illustrative example of one possible type of power and data connection between a device and a charging system. Charging status indicator control as described herein is not dependent upon any particular type of connection or interface, and is adaptable to other types of connections, associated with integrated power/data interfaces or separate power and data interfaces. It will also be apparent that a data connection is not required where power connection signaling schemes are implemented. Where a device and a charging system are configured to detect particular potential or current levels on a power connection, a data connection is not necessary.

We claim:

1. A Universal Serial Bus ("USB") charger able to provide power through a USB connector, the USB connector configured to be connectable to at least one USB-equipped mobile device, comprising:
   a power source interface configured to receive power from a source other than the USB charger;
   a power converter coupled to the power source interface, the power converter configured to use the received power to generate power output;
   a charging controller configured to control an amount of power provided at the USB connector on the power lines, the controlled amount of power derived from the power output, and configured to generate an identification signal on the USB connector's two data lines, the identification signal usable to indicate the USB charger is not subject to the standard USB power limitations, the identification signal provided at the USB connector and comprising an invalid data line state.

2. The USB charger of claim 1 where the invalid data line state comprises both data lines pulled into a high state.

3. The USB charger of claim 2 where the data lines are pulled into the high state using at least one resistor.

4. The USB charger of claim 2 where the data lines are coupled.

5. The USB charger of claim 4 where the data lines are pulled into the high state using at least one resistor.

6. The USB charger of claim 1 further comprising a plurality of USB connectors operably connected to the charging controller.

7. A method for providing a charge current by a Universal Serial Bus ("USB") charger having a USB connector, the USB connector configured to be operably connectable to at least one USB-equipped mobile device, comprising:
   receiving, at a power source interface configured to receive power from a source other than the USB charger, power;
   converting the received power into output power;
   controlling an amount of power provided at the USB connector on the power lines, the controlled amount of power derived from the power output;
   generating an identification signal on the USB connector's two data lines, the identification signal usable to indicate the USB charger is not subject to the standard USB power limitations, the identification signal comprising an invalid data line state.

8. The method of claim 7 where the invalid data line state comprises both data lines pulled into a high state.

9. The method of claim 8 further comprising pulling the data lines high using at least one resistor.

10. The method of claim 7 where the data lines are coupled.

11. The method of claim 10 further comprising pulling the data lines high using at least one resistor.

12. A method for providing a charge current by a Universal Serial Bus ("USB") charger having a USB connector, the USB connector configured to be operably connectable to at least one USB-equipped mobile device, comprising:
   receiving, at a power source interface configured to receive power from a source other than the USB charger, power;
   converting the received power into output power;
   controlling an amount of power provided at the USB connector on the power lines, the controlled amount of power derived from the power output;
   generating a signal on the USB connector's two data lines, the identification signal comprising an invalid data line state; and
   sending power output to the USB connector based on at least one of voltage and current draw detectable from the power lines of the USB connector, differently than normal USB power limitations.

13. The method of claim 12 where the invalid data line state comprises both data lines pulled into a high state.

14. The method of claim 13 further comprising pulling the data lines high using at least one resistor.

15. The method of claim 12 where the data lines are coupled.

16. The method of claim 15 further comprising pulling the data lines high using at least one resistor.

17. A method for signaling by a Universal Serial Bus ("USB") charger having a USB connector, the USB connector configured to be operably connectable to at least one USB-equipped mobile device, comprising:
   receiving, at a power source interface configured to receive power from a source other than the USB charger, power;
   converting the received power into output power;
   providing power at the USB connector, the power derived from the power output;

providing a signal on the USB connector's two data lines, the signal comprising an invalid data line state.

18. The method of claim 17 where the invalid data line state comprises both data lines pulled into a high state.

19. The method of claim 18 further comprising pulling the data lines high using at least one resistor.

20. The method of claim 17 where the data lines are coupled.

21. The method of claim 20 further comprising pulling the data lines high using at least one resistor.

* * * * *

UNITED STATES PATENT AND TRADEMARK OFFICE
CERTIFICATE OF CORRECTION

PATENT NO. : 7,573,242 B2
APPLICATION NO. : 11/749676
DATED : August 11, 2009
INVENTOR(S) : Ryan M. Bayne et al.

Page 1 of 1

It is certified that error appears in the above-identified patent and that said Letters Patent is hereby corrected as shown below:

On title page
Item (75) Inventors: replace "Skarine Alexei" with -- Alexei Skarine --

Item (30) Foreign Application Priority Date: replace "Apr. 30, 2004" with -- Apr. 30, 2003 --

Signed and Sealed this

Seventeenth Day of November, 2009

David J. Kappos
*Director of the United States Patent and Trademark Office*